(12) United States Patent
Ogle

(10) Patent No.: US 9,672,163 B2
(45) Date of Patent: Jun. 6, 2017

(54) FIELD LOCKABLE MEMORY

(71) Applicant: THOMSON LICENSING, Issy de Moulineaux (FR)

(72) Inventor: Ronald Roy Ogle, Carmel, IN (US)

(73) Assignee: THOMSON LICENSING, Issy-les-Noulineaux (FR)

( * ) Notice: Subject to any disclaimer, the term of this patent is extended or adjusted under 35 U.S.C. 154(b) by 100 days.

(21) Appl. No.: 14/676,252

(22) Filed: Apr. 1, 2015

(65) Prior Publication Data

US 2015/0301958 A1 Oct. 22, 2015

Related U.S. Application Data

(60) Provisional application No. 61/980,877, filed on Apr. 17, 2014.

(51) Int. Cl.
| | |
|---|---|
| *G06F 12/00* | (2006.01) |
| *G06F 12/14* | (2006.01) |
| *G06F 12/02* | (2006.01) |
| *G06F 21/79* | (2013.01) |

(52) U.S. Cl.
CPC ...... *G06F 12/1466* (2013.01); *G06F 12/0246* (2013.01); *G06F 21/79* (2013.01); *G06F 2212/1052* (2013.01)

(58) Field of Classification Search
CPC ............ G06F 12/1466; G06F 12/0246; G06F 2212/7201; G06F 2212/1052
USPC ....................................................... 711/103
See application file for complete search history.

(56) References Cited

U.S. PATENT DOCUMENTS

| | | | |
|---|---|---|---|
| 5,666,535 A | 9/1997 | Komori et al. | |
| 6,810,464 B1 | 10/2004 | Sipple et al. | |
| 6,922,744 B1 | 7/2005 | Sipple et al. | |
| 6,986,003 B1 | 1/2006 | Sipple et al. | |
| 7,193,503 B2 | 3/2007 | Fisher | |
| 7,484,105 B2 * | 1/2009 | Goodman | G06F 21/572 |
| | | | 380/277 |
| 7,621,447 B1 | 11/2009 | Sarma et al. | |
| 7,756,272 B2 | 7/2010 | Kocher et al. | |
| 7,760,876 B2 | 7/2010 | Kocher et al. | |
| 7,778,420 B2 | 8/2010 | Kocher et al. | |
| 7,979,658 B2 | 7/2011 | Obereiner et al. | |
| 7,984,511 B2 | 7/2011 | Kocher et al. | |
| 7,987,510 B2 | 7/2011 | Kocher et al. | |
| 7,996,913 B2 | 8/2011 | Kocher et al. | |
| 8,055,856 B2 | 11/2011 | Coon et al. | |
| 8,055,910 B2 | 11/2011 | Kocher et al. | |
| 8,131,646 B2 | 3/2012 | Kocher et al. | |
| 8,375,176 B2 | 2/2013 | Coon et al. | |

(Continued)

*Primary Examiner* — Matthew Bradley
(74) *Attorney, Agent, or Firm* — Brian J. Dorini; Patricia A. Verlangieri

(57) ABSTRACT

The present principles relate to a method of imprinting new identifying information to a flash memory device. The method includes receiving, at a flash memory, a new identifying information to be written to the flash memory, the flash memory having a plurality of sectors and a pointer associated therewith, the plurality of sectors including a locked first sector that includes previously written identifying information, the pointer including an address of the first sector; writing the new identifying information to a second sector of the plurality of sectors, the second sector being open and lockable; and locking the second sector.

13 Claims, 3 Drawing Sheets

(56) References Cited

U.S. PATENT DOCUMENTS

| | | |
|---|---|---|
| 8,392,985 B2 | 3/2013 | Natu et al. |
| 2009/0172252 A1* | 7/2009 | Tomlin ................... G06F 8/665 |
| | | 711/103 |

* cited by examiner

FIELD LOCKABLE MEMORY

This application claims the benefit, under 37 CFR 1.55 of Provisional Application No. 61/980,877, filed Mar. 17, 2014.

FIELD

The techniques relate to flash memory control, and more particularly to memory control configurations for implementing field locking of a flash memory.

BACKGROUND

Many electronic devices in today's market need ways to uniquely identify themselves to other electronic devices with which it must communicate. Such devices typically identify themselves using information that is unique to that particular device, such as a Medium Access Control ("MAC") address. Such identifying information is typically stored in a memory, such as a flash memory, when the device is constructed. In practice, the identifying information is written to the flash memory during manufacturing, after which the portion of the memory storing the identifying information is subsequently locked such that it cannot be changed after it is installed in the device. This provides a high level of confidence that the operation is correct and can be tested. This also means that these sectors are not changeable, thereby preventing any post-manufacturing customization or adjustments to the identifying information of the flash memory.

However, there are users of such devices that wish to implement changes to the identifying information after receiving it from a manufacturer. This is particularly true with respect to devices such as set-top boxes, which are owned by service providers but distributed to customers, as the service provider may wish to adjust this identifying information to include other information suitable for its market. Unfortunately, under the current system of storing identifying information to flash memory, allowing such changes would compromise the security of the information that is supposed to be "locked" in the memory.

SUMMARY

It is desirable to maintain the security of the manufacturing process of a memory while adding flexibility to make changes in the field to adjust to new markets and upgrades/downgrades of a device. The present techniques relate to a method of imprinting new identifying information to a flash memory device. The method includes receiving, by a flash memory in a device, a new data package containing identifying information to be written to the flash memory, the flash memory having a plurality of sectors and a pointer associated therewith, the plurality of sectors including a locked first sector that includes previously written identifying information, the pointer including an address of the first sector; writing the new identifying information from the data package to a second sector of the plurality of sectors, the second sector being open and lockable; locking the second sector, and changing the pointer to the new locked sector.

The present techniques also relate to a flash memory device. The flash memory device includes a flash memory having a plurality of sectors, each of the plurality of sectors being lockable and configured to have information written thereon, the plurality of sectors including a locked first sector having previously written identifying information thereon. The flash memory device also includes a processor configured to receive a new data package containing identifying information to be written to the flash memory; write the new identifying information to a second sector of the plurality of sectors; lock the second sector; and change the pointer to the new locked sector.

BRIEF DESCRIPTION OF THE DRAWINGS

For a more complete understanding of the present techniques, reference is made to the following detailed description of an embodiment considered in conjunction with the accompanying drawings, in which.

DETAILED DESCRIPTION

The following provides an illustration of the general principles of the present techniques and is not meant to limit, in any way, the inventive concepts contained herein. Moreover, the particular features described in this section can be used in combination with the other described features in each of the multitude of possible permutations and combinations contained herein.

All terms defined herein should be afforded their broadest possible interpretation, including any implied meanings as dictated by a reading of the specification as well as any words that a person having skill in the art and/or a dictionary, treatise, or similar authority would assign particular meaning.

Further, it should be noted that, as recited in the specification and in the claims appended herein, the singular forms 'a,' "an," and "the" include the plural referents unless otherwise stated. Additionally, the terms "comprises" and "comprising" when used herein specify that certain features are present in that embodiment, however, this phrase should not be interpreted to preclude the presence or additional of additional steps, operations, features, components, and/or groups thereof.

The present principles generally relate to a flash memory having multiple lockable sectors for storing identifying information. The present principles also relate to a method of changing the identifying information on a flash memory having multiple lockable sectors.

Figure 1:
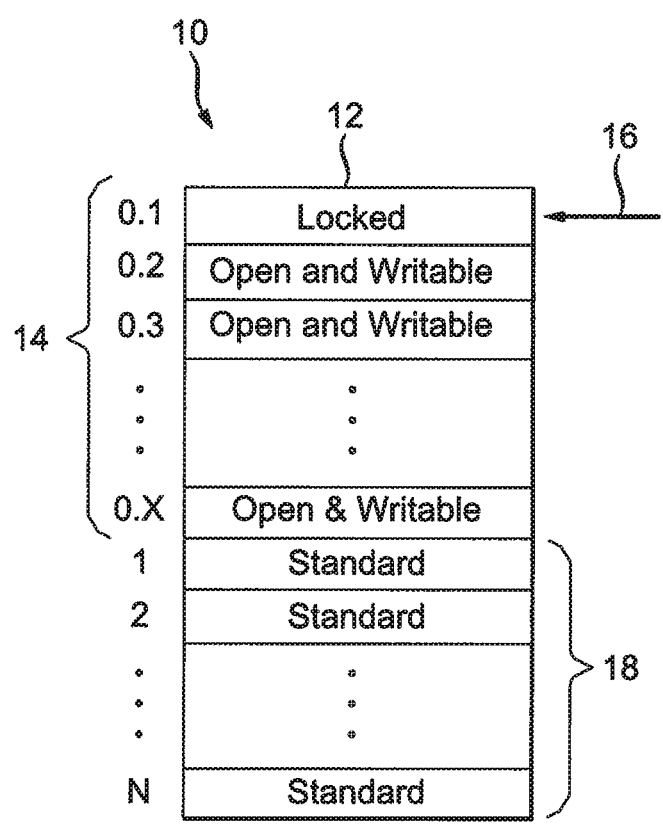
FIG. 1 is a diagram of a flash memory of a flash memory device in accordance with an embodiment of the present principles.

FIG. 1 illustrates a flash memory device 10 that includes a flash memory chip 12 having a plurality of field lockable sectors 14 and a plurality of standard sectors 18 in accordance with an embodiment of the present principles. The plurality of field lockable sectors 14 includes a first sector (e.g., Sector 0.1) that has identifying information already written to it, while Sectors 0.2 through 0.X contain no information. In one embodiment, each of the Sectors 0.1-0.X of the plurality of sectors 14 has one megabyte of storage space. Other embodiments can have sectors which are larger or smaller than one megabyte.

Each of the plurality of field lockable sectors 14 of the flash memory chip 12 is lockable such that once locked, the information therein cannot be changed. In one embodiment, the sector containing the identifying information (e.g., Sector 0.1) is locked by the manufacturer of the flash memory device 10. The remaining sectors (e.g., Sectors 0.2-0.X) are open but can be locked if so desired. Such locking can take place through processes well known in the art, such as blowing a fuse, etc.

In addition, the flash memory device 10 includes a pointer 16 that contains the address of the sector of the plurality of field lockable sectors 14 that includes the identifying information (e.g., Sector 0.1) that now defines Sector 0. The pointer 16 can be changed (not shown in FIG. 1) to point to the next consecutive sector (e.g., Sector 0.2) when new identifying information is written to that sector at which time Sector 0 is represented by the content of Sector 0.2.

Figure 2:
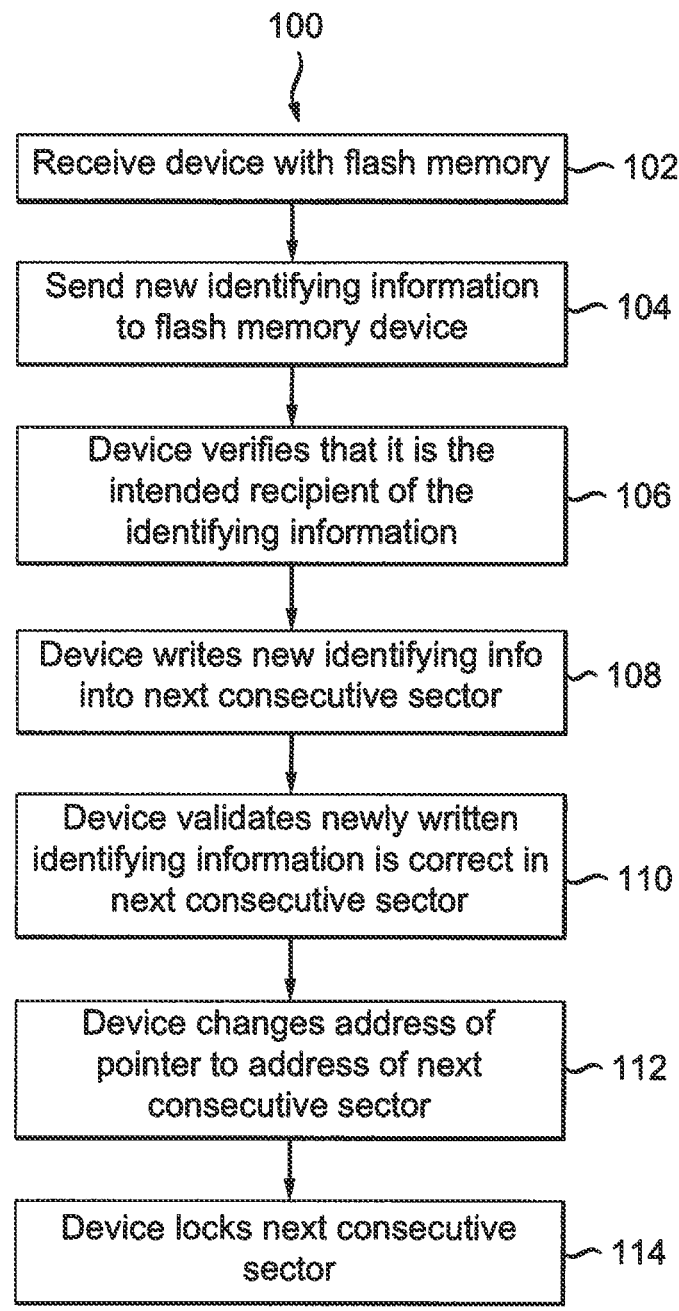
FIG. 2 is a flow chart illustrating a process of changing the lockable sector configuration of a flash memory in accordance with an embodiment of the present principles.

FIG. 2 illustrates a method 100 of imprinting new identifying information to the flash memory 10 in accordance with an embodiment of the present principles. The method begins by a user receiving the flash memory device 10 from its source (step 102), such as a manufacturer and the like. The flash memory device 10 then receives replacement identifying information for imprinting on the flash memory 112 from a user of a device (step 104). The user can be, for example, can be a subsequent manufacturer of a device that implements the flash memory device 10. The flash memory device 10 then verifies that it is the intended recipient of the identifying information (step 106), and then writes the new identifying information to the next consecutive sector (e.g., Sector 0.2) of the flash memory 12 (step 108).

Once the new identifying information is written to the next consecutive sector of the flash memory 12, the flash memory device 10 then validates the new identifying information (step 110). Once the newly written identifying information has been validated in Sector 0.2, the flash memory device 10 then changes the address of the pointer 16 to point to Sector 0.2 (step 112). The flash memory device 10 then locks Sector 0.2 so that it cannot be changed (step 114). Steps 112 and 114 are interchangeable from a sequencing standpoint.

Figure 3:
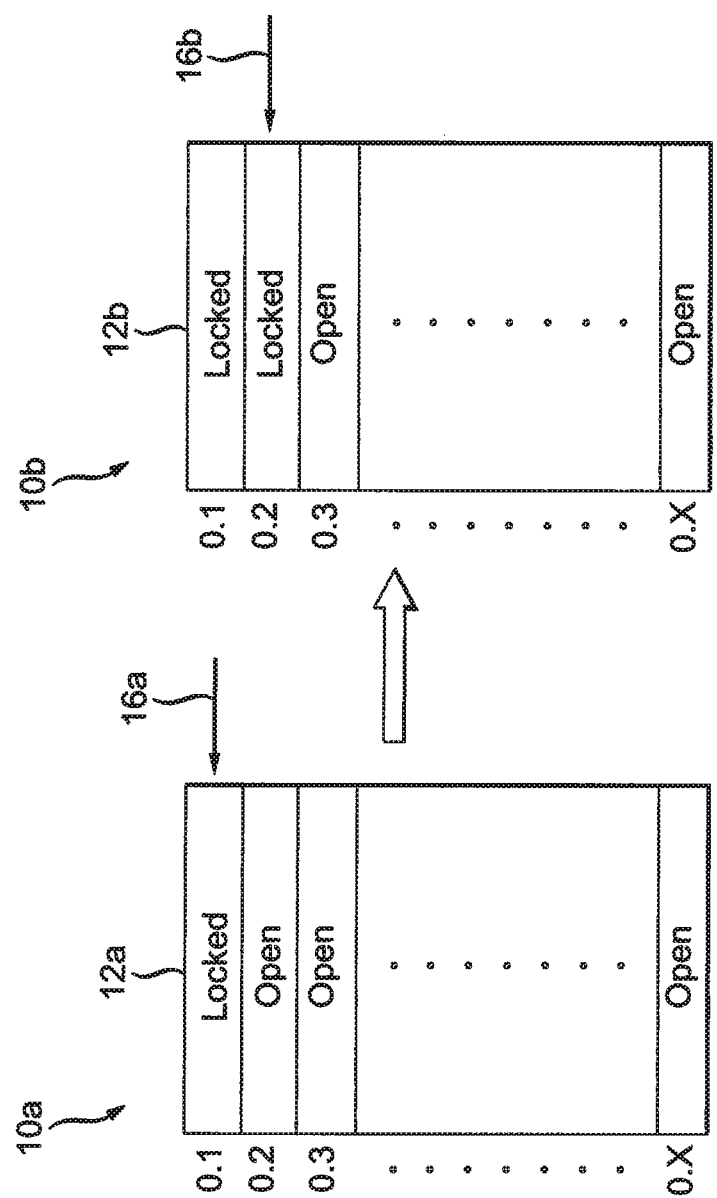
FIG. 3 is a histogram of a flash memory undergoing a chance in the lockable sector configuration in accordance with an embodiment of the present principles.

FIG. 3 illustrates how the flash memory 12 of the flash memory device 10 changes after executing the method discussed above and illustrated in FIG. 2. Flash memory device 10a is shown as existing prior to undergoing a change in the identifying information, with Sector 0.1 of the flash memory 12a being locked with the identifying information it received from the manufacturer, and the pointer 16a pointing to Sector 0.1 while Sectors 0.2-0.X are available. After new identifying information has been imprinted to the flash memory device 10b in accordance with the method described above, the flash memory 12b now has both Sectors 0.1 and 0.2 locked, but with the pointer 16b pointing to Sector 0.2. As a result, the information in Sector 0.1 of the flash memory 12b is essentially overlooked, as if it no longer exists. Thereafter, any request for the identifying information of the flash memory device 10b located in Sector 0 will look to the newly written identifying information written in Sector 0.2, not Sector 0.1.

In one embodiment, the validating of the newly written identifying information (step 110) is accomplished through a unique hash function, which is a mathematical algorithm that creates a unique number for each document or code passed through it. The hash enables the flash memory device 10 to verify that the newly written identifying information it wrote to the flash memory 12 is the same information it received from the outside source. Such a hash function validation begins by taking the new identifying information received from the outside source, applying it to the hash function and receiving a first number. Then, once the new identifying information has been written to the flash memory 12, the newly written identifying information is then read back into the hash function to receive a second number. If the first number, which is unique to the new identifying information, matches the second number, then the newly written identifying information is validated.

If the first number and the second number do not match, then the new identifying information is rewritten to, for example, Sector 0.2, and the hash validation is executed again. This process repeats until the first number matches the second number, or until a predetermined number of attempts have been made with no success, leading to the conclusion that Sector 0.2 is bad or malfunctioning. In such circumstances, the flash memory device 10 then identifies Sector 0.2 as bad and proceeds to write the new identifying information to the following consecutive sector (e.g., Sector 0.3).

The various embodiments disclosed herein can be implemented as hardware, firmware, software, or any combination thereof. Moreover, the software is preferably implemented as an application program tangibly embodied on a program storage unit or computer readable medium. The application program can be uploaded to, and executed by, a machine comprising any suitable architecture. Preferably, the machine is implemented on a computer platform having hardware such as one or more central processing units ("CPUs"), a memory, and input/output interfaces. The computer platform can also include an operating system and microinstruction code. The various processes and functions described herein can be either part of the microinstruction code or part of the application program, or any combination thereof, which can be executed by a CPU, whether or not such computer or processor is explicitly shown.

All examples and conditional language recited herein are intended for pedagogical purposes to aid the reader in understanding the principles of the techniques and the concepts contributed by the inventor to furthering the art, and are to be construed as being without limitation to such specifically recited examples and conditions. Moreover, all statements herein reciting principles, aspects, and embodiments of the principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It will be understood that the embodiments described herein are merely exemplary and that a person skilled in the art can make many variations and modifications without departing from the spirit and scope of the invention. All such variations and modifications are intended to be included within the scope of the invention as defined in the appended claims.

The invention claimed is:

1. A method of imprinting new identifying information to a flash memory device, comprising:
   receiving, at a flash memory, a new identifying information to be written to the flash memory, the flash memory having a plurality of sectors and a pointer associated therewith, the plurality of sectors including a locked first sector that includes previously written identifying information, the pointer including an address of the first sector;
   writing the new identifying information to a second sector of the plurality of sectors, the second sector being open and lockable;

validating the new identifying information in the second sector to determine that the new identifying information was written correctly to the second sector, wherein the validating includes applying the new information to a hash function to produce a first number, applying the new information written in the new sector to the hash function to produce a second number, and checking for whether the first number matches the second number and wherein the new identifying information is written to a third sector when the first number does not match the second number; and locking the second sector.

2. The method recited in claim 1, further comprising changing the address of the pointer from the address of the first sector to an address of the second sector.

3. The method recited in claim 1, further comprising verifying the new identifying information prior to writing the new identifying information to the second sector to determine that the new identifying information is intended to be written to the flash memory.

4. The method recited in claim 1, wherein the third sector being open and lockable.

5. The method recited in claim 4, further comprising indicating the second sector as bad, validating the new identifying information in the third sector, and locking the third sector.

6. The method recited in claim 5, further comprising changing the address of the pointer from the address of the first sector to an address of the third sector.

7. A flash memory device comprising:
a flash memory having a plurality of sectors, each of the plurality of sectors being lockable and configured to have information written thereon, the plurality of sectors including a locked first sector having previously written identifying information thereon; and
a processor configured to:
receive a new identifying information to be written to the flash memory;
write the new identifying information to a second sector of the plurality of sectors;
validate the new identifying information in the second sector to determine that the new identifying information was written correctly to the second sector, wherein the validating includes applying the new information to a hash function to produce a first number, applying the new information written in the new sector to the hash function to produce a second number, and checking for whether the first number matches the second number and wherein the new identifying information is written to a third sector when the first number does not match the second number; and
lock the second sector.

8. The flash memory device of claim 7, wherein the processor is further configured to change an address of a pointer from an address of the first sector to an address of the second sector.

9. The flash memory device of claim 7, wherein the processor is further configured to verify the new identifying information prior to writing the new identifying information to the second sector to determine that the new identifying information is intended to be written to the flash memory.

10. The flash memory device of claim 7, wherein the third sector being open and lockable.

11. The flash memory device of claim 10, wherein the processor is further configured to mark the second sector as bad, validate the new identifying information in the third sector, and lock the third sector.

12. The flash memory device of claim 11, wherein the processor is further configured to change an address of a pointer from an address of the first sector to an address of the third sector.

13. A non-transitory computer-readable medium having instructions thereon for causing a processor of a flash memory device to perform the following:
receive, at a flash memory, a new identifying information to be written to a flash memory, the flash memory having a plurality of sectors and a pointer associated therewith, the plurality of sectors including a locked first sector that includes previously written identifying information, the pointer including an address of the first sector;
write the new identifying information to a second sector of the plurality of sectors, the second sector being open and lockable;
validate the new identifying information in the second sector to determine that the new identifying information was written correctly to the second sector, wherein the validating includes applying the new information to a hash function to produce a first number, applying the new information written in the new sector to the hash function to produce a second number, and checking for whether the first number matches the second number and wherein the new identifying information is written to a third sector when the first number does not match the second number; and
lock the second sector.

* * * * *